(12) United States Patent
Condemine et al.

(10) Patent No.: US 7,337,668 B2
(45) Date of Patent: Mar. 4, 2008

(54) ACCELEROMETER IN CLOSED LOOP WITH ERROR DETECTION

(75) Inventors: Cyril Condemine, Grenoble (FR); Nicolas Delorme, Grenoble (FR); Marc Belleville, St. Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 254 days.

(21) Appl. No.: 11/114,033

(22) Filed: Apr. 26, 2005

(65) Prior Publication Data
US 2005/0257597 A1 Nov. 24, 2005

(30) Foreign Application Priority Data
May 4, 2004 (FR) ................... 04 04802

(51) Int. Cl.
*G01P 15/00* (2006.01)
*G01P 21/00* (2006.01)
(52) U.S. Cl. ............... 73/509; 73/1.37; 73/1.38
(58) Field of Classification Search ............ 73/509, 73/1.37–1.38, 514.01; 702/141, FOR. 151
See application file for complete search history.

(56) References Cited

U.S. PATENT DOCUMENTS

| | | | |
|---|---|---|---|
| 3,691,356 A * | 9/1972 | Miller | 701/15 |
| 4,321,678 A * | 3/1982 | Krogmann | 701/220 |
| 5,150,856 A * | 9/1992 | Gaide | 244/3.2 |
| 5,277,053 A * | 1/1994 | McLane et al. | 73/1.38 |
| 5,327,212 A * | 7/1994 | Ficalora et al. | 356/459 |
| 5,341,681 A * | 8/1994 | Molny et al. | 73/382 G |

(Continued)

FOREIGN PATENT DOCUMENTS

EP 172666 A * 2/1986

(Continued)

OTHER PUBLICATIONS

Haluk Kulah, et al., "A CMOS Switched-Capacitor Interface Circuit for an Integrated Accelerometer", Proceedings of the 43rd. IEEE Midwest Symposium on Circuits and Systems, vol. 1 or 3, XP-010558120, Aug. 8, 2000, pp. 244-247.

(Continued)

*Primary Examiner*—Thomas P. Noland
(74) *Attorney, Agent, or Firm*—Oblon, Spivak, McClelland, Maier & Neustadt, P.C.

(57) ABSTRACT

An accelerometric measurement device with a return loop including accelerometer, a corrector generating a signal for correction of the position of the accelerometer, a closed return loop to apply this correction signal to the accelerometer, a detector to detect an error in operation of the accelerometer, and a modifying component making at least a first modification to operation of the corrector from its initial state to a modified operating state.

20 Claims, 4 Drawing Sheets

U.S. PATENT DOCUMENTS

| | | | | |
|---|---|---|---|---|
| 5,583,290 | A | 12/1996 | Lewis | 73/514.18 |
| 5,621,157 | A * | 4/1997 | Zhao et al. | 73/1.38 |
| 6,035,694 | A * | 3/2000 | Dupuie et al. | 73/1.38 |
| 6,285,111 | B1 * | 9/2001 | Hulsing, II | 310/306 |
| 6,304,809 | B1 * | 10/2001 | Cullen et al. | 701/93 |
| 6,364,811 | B1 * | 4/2002 | Hubbard et al. | 477/143 |
| 6,588,117 | B1 * | 7/2003 | Martin et al. | 33/328 |
| 2003/0140699 | A1 | 7/2003 | Pike et al. | 73/514.32 |
| 2004/0186676 | A1 * | 9/2004 | Liu et al. | 702/92 |
| 2006/0020382 | A1 * | 1/2006 | Shin et al. | 701/42 |
| 2006/0260828 | A1 * | 11/2006 | Berg | 173/2 |
| 2007/0213902 | A1 * | 9/2007 | Shin et al. | 701/42 |

FOREIGN PATENT DOCUMENTS

| | | | | |
|---|---|---|---|---|
| EP | | 346178 | * 12/1989 | |
| EP | | 630723 A2 | * 12/1994 | |
| JP | | 60146649 A | * 8/1985 | 470/99 |

OTHER PUBLICATIONS

Mark Van Paemel, "Interface Circuit For Capacitive Accelerometer", Sensors and Actuators, vol. 17, No. 3/4, XP-000081664, May 1, 1989, pp. 629-637.

Martin Handtmann, et al., "Sensitivity enhancement of MEMS inertial sensors using negative springs and active control", Sensors and Actuators A 97-98, 2002, pp. 153-160.

A. Gola, et al., "A 80dB-SNR±1g fully-integrated biaxial linear accelerometer in a standard 0.5 μm CMOS technology for high-sensitivity applications", ESSCIRC 2002, pp. 631-634.

* cited by examiner

ACCELEROMETER IN CLOSED LOOP WITH ERROR DETECTION

TECHNICAL DOMAIN AND PRIOR ART

The invention relates to the domain of accelerometric measurement.

This type of measurement can be used to convert an acceleration into an analogue or digital electrical signal.

It is applicable to a variety of domains such as automobiles and avionics.

The document by Haluk Kulah et al. entitled "*A CMOS switched-capacitor interface circuit for an integrated accelerometer*", Proceedings of the 43rd-*IEEE Midwest Symposium on Circuits and Systems*, 244-7, Vol. 1. describes an accelerometer using a digital corrector capable of significantly increasing the signal to noise ratio.

Accelerometric measurement devices with digital retroaction induce a variation in the stiffness of the accelerometer by adding a negative electrostatic stiffness. This stiffness is created by the voltages applied to the combs of the accelerometer for reading and for retroaction.

FIG. 1 shows an architecture of an accelerometer 2 with digital return used for measurement of accelerations $\Gamma$: a sigma-delta modulator 4 reads the variable capacities of an accelerometer 2 and also applies electrical voltages. These electrical voltages are converted by the accelerometer 2 into an electrostatic force that depends on the return from a corrector 10.

This corrector 10 can keep the accelerometer 2 to its central position. The output in the system corresponds to the output S from this corrector 10.

The average value of this output S represents the acceleration: an attractive electrostatic force is applied to one of the sides of the accelerator 2 at a very high frequency f1, to bring it back into its central position.

Since the cut-off frequency f2 of the accelerometer 2 is lower than f1, the accelerometer filters this pulse train and the value applied at its terminals will be an average.

A problem with this closed loop measurement is saturation of the system due to an acceleration or a shock outside the measurement range. This range depends on the physical characteristics of the accelerometer 2 (stiffness, mass, damping, etc.) and technological limits of the voltage of the demodulator 4.

This saturation causes a calculation error in the digital corrector 10 that can cause sticking of the branches of the comb and temporary loss of functions until separation, or permanent loss of functions (permanent sticking, breakage, saturation, etc.).

If this occurs, the system is completely deactivated and no longer measures the acceleration; therefore, there is a complete loss of the measurement function and the associated measurement.

Therefore, the problem arises of finding an accelerometer and a method for measuring accelerations that is capable of solving this type of situation and particularly making the system continue to operate following a system error, or in the case of saturation.

Another problem that arises is to perform a function for the measurement of an acceleration signal or an acceleration following a malfunction in an accelerometer, for example due to saturation.

PRESENTATION OF THE INVENTION

In particular, the invention relates to a closed loop digital accelerometer, the operation of which can be degraded, for example in open loop, when an operating error occurs on the accelerometer.

The invention relates firstly to an accelerometric measurement device with return loop comprising:
- an accelerometer,
- a digital corrector, to generate a signal for correction of the position of the accelerometer,
- a closed return loop to apply this correction signal to the accelerometer,
- an error detector to detect an error in operation of the accelerometer, and making a first modification to operation of the corrector from its initial state to a modified operating state.

An accelerometric measurement device according to the invention can perform an acceleration measurement function, even in degraded form, if there is an error in operation of the accelerometer.

The error may be a saturation.

The modified operating state may be an open loop operating state.

The invention can then make use of the advantages of closed loop and the robustness of operation in open loop.

According to one embodiment, the means of modifying operation of the corrector are capable of opening the accelerometer return loop.

These means are capable of modifying one or several operating parameters of the said corrector.

The accelerometer operation error detector and the means of modifying operation of the corrector may be at the output from the corrector.

The device may also comprise means of making a second modification to operation of the corrector from its modified operating state to an initial state.

This second modification of the corrector may be made in a single step.

As a variant, this second modification to operation of the corrector may be made in several steps.

The second modification to operation of the corrector may be made by modifying the gain of the return loop.

The accelerometer operation error detector can be used to detect a saturation state of the accelerometer.

DETAILED PRESENTATION OF PARTICULAR EMBODIMENTS

Figure 1:
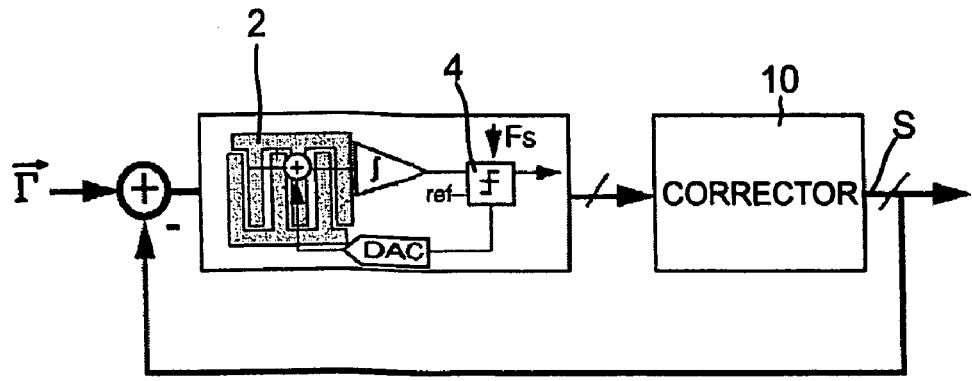
FIG. 1 shows a digital accelerometer with no error detection.
Figure 2:
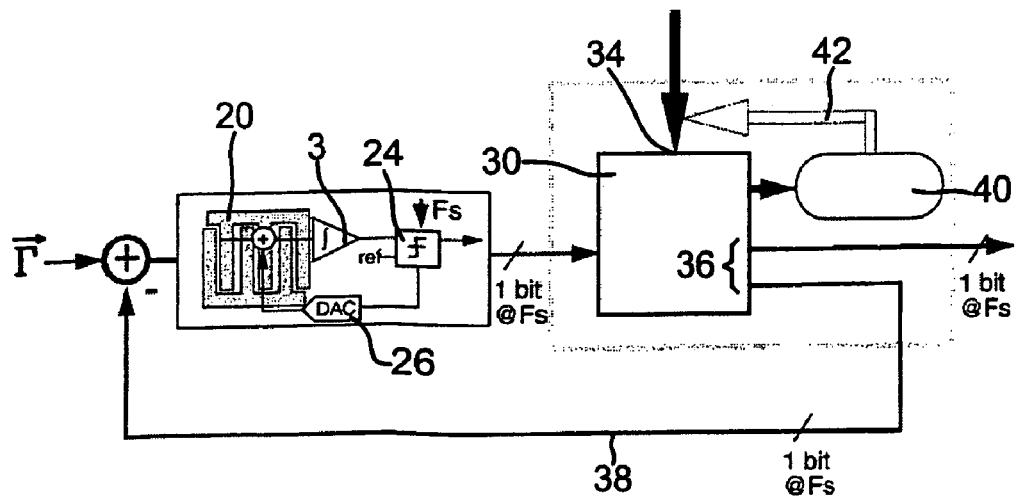
FIG. 2 shows a digital accelerometer according to the invention.

An accelerometric system with digital return according to the invention will now be described with reference to FIG. 2.

Such a system comprises an accelerometer 20 and means such as a $\Sigma-\Delta$ demodulator for reading variable capacities of the accelerometer, and application of electrical voltages, for example including a quantifier 24, a digital-analogue converter 26 and an integrator 23 at the output from the accelerometer.

Digital correction means 30 or a corrector can be used to generate an accelerometer position correction signal using the signal measured by the accelerometer or a signal representative of this measured signal, and to hold the accelerometer 20 in its central position through a return loop 38.

The digital corrector 30 is a device managed by coefficients that may be memorised and that perform functions. Depending on the value given to these coefficients, it is possible to obtain:

a unit function,
or a gain function 2, 3, . . . ,
or opening of the loop,
etc.

The initial coefficients may be applied to an input 34 of these correction means 30.

These initial coefficients are determined such that the output voltages applied to the accelerometer (through the return 38) are resisted by the accelerometer and by the electronic circuit; these coefficients are optimised to keep the mass in its central position within the initially fixed operating range.

The output 36 from the corrector 30 is for example coded on one bit (which then corresponds to an On/Off modulation).

The average value of this output represents the acceleration: an attractive electrostatic force is applied through the return loop 38 to one of the sides of the accelerometer to bring it back into its central position, preferably at a very high frequency.

According to the invention, an error detector 40 can detect an error in the normal operation of the accelerometer, and particularly a saturation state of the means 30.

In this case, the accelerometer is subjected to forces outside the expected range: the accelerometer mass moves to its stop. Electrical magnitudes are then equal to values outside range, and for example all coefficients change to 1.

The detector 40 may be placed at the output from the corrector 30.

When an error is detected, means 42 can be used to modify coefficients input through the corrector 30. For example, the initial coefficients are in a memory and a logical function modifies them. This logical function may be hard wired, or it may be written into a program.

In particular, a modification that can thus be obtained is a deletion of the return 38 by modifying the result of the logical function that manages the output 38. The logical function may for example be of the following type:

IF saturation detected,
THEN signal at output of 38=0

For example, coefficients of corrector 30 are modified to obtain a unit function at the output 36 that deletes the return effect: the system then changes to an open loop.

Therefore the effect of the corrector can be cancelled (the term <<reset corrector>> is used in the following) when saturation is detected.

The output 36 is then equal to the output from means 24 and the return becomes zero: no further information is returned to the accelerometer 20.

The resulting stiffness (mechanical minus electrostatic) of the accelerometer is then greater: there is no longer any counter-reaction voltage applied on the accelerometer combs; therefore the negative electrostatic stiffness is reduced.

This stiffness becomes a function of read voltages only, which are much smaller than actuation voltages.

The device or the accelerometric MEMS is then stiffer and the full input scale then becomes larger.

The system no longer saturates and the acceleration is measured in open loop.

The measurement performances are then not as good due to non-linearities created by the movement of masses, but are more robust. For example, moving masses may be in the form of built-in combs. However the measurement function is maintained, even if the performances are not as good as in closed loop.

Figure 3:
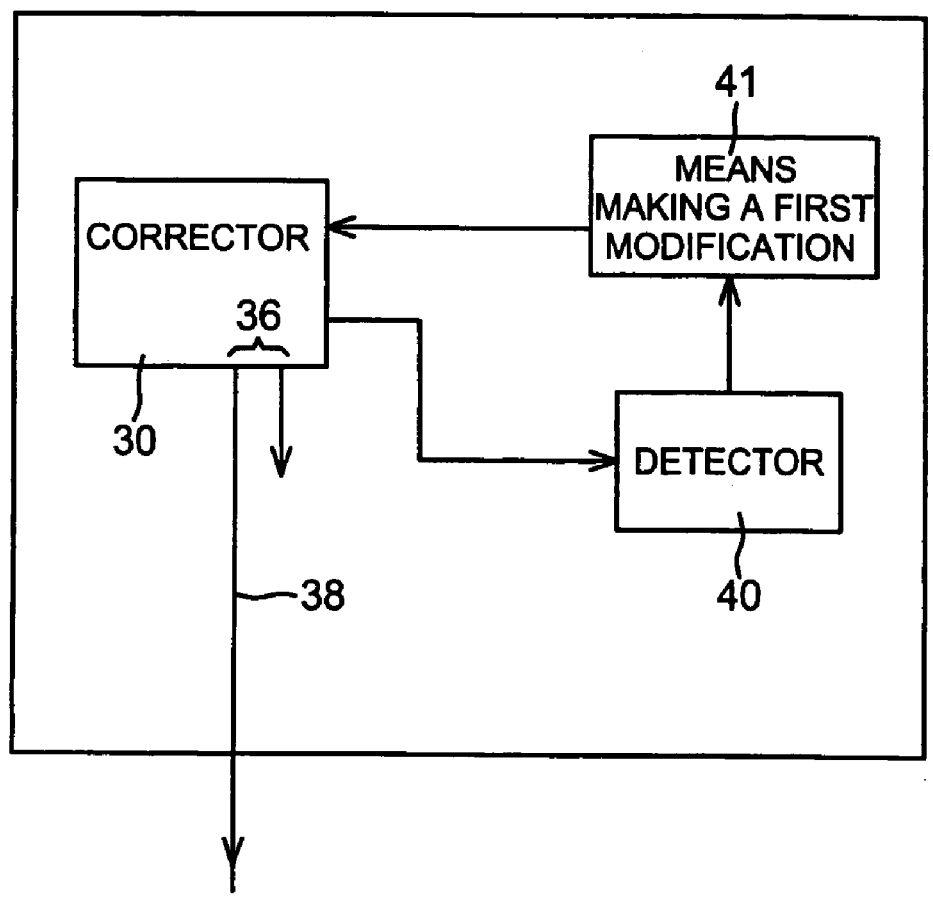
FIG. 3 shows an embodiment of the correction means.

One embodiment of the coefficient correction means is illustrated in FIG. 3; in this Figure, the reference 40 also denotes a saturation detector at the output from the error corrector 30. Means 41 are used to make a correction as explained above. For example, these means 41 are capable of modifying the initial memorised coefficients, or perform logical functions.

More generally, an accelerometer operation error may be detected by the means 40 that then enable the means 41 to modify the parameters or the operating state.

The system will attempt to close the loop 38 to restore the initial performances of the circuit (pass band, full scale, signal to noise ratio and total harmonic distortion (THD)) and to return to nominal or initial operation.

One solution for closing the loop consists of using means 41 and 42 to restore the initial state of the corrector, for example by reprogramming correction means 30 with initial values of coefficients. This could take place between two strokes of the modulator clock 24.

The corrector 30 then returns to the initial state in a single step.

However, this solution reduces the chances of returning to a stable state because the mechanical stiffness is modified again by reinitialising the return, thus causing an oscillation before the return to a stable state. This oscillation can cause saturation again.

Therefore, another better solution is therefore to progressively restore the initial state or initial coefficients in successive steps, but this time progressively modifying the sensitivity of the corrector 30 following the movements of the accelerator mass. For example, a low value of the coefficients will be used initially followed by a progressive return to the initial state or to the initial coefficients (for example in 3 steps or skips).

According to one example, the procedure starts from the unit function for which the corrector is insensitive to accelerometer movements (zero return): $S=1\times E$. For example (and in a simplified manner), the next step would be to set $S=2\times E$ then $3\times E$, . . . etc. The frequency of movements during this return to the normal gain can also be taken into account.

Therefore, the following is one example of the method according to the invention:

Detect a saturation in the digital part,
Open the loop 38: this return loop is cancelled and the coefficients of the corrector 30 are modified,
individual reset (RAZ) of the corrector 30,
Measurement in open loop,
Periodic test of closing the open loop, then return to the closed loop measurement.

The invention is always capable of measuring the acceleration. The accelerometer measurement function is never lost although its performances are degraded, and particularly the signal/noise ratio (SNR) (the accelerometer transfer function is no longer used in the noise calculation) and the THD (the variable air gap capacities are particularly nonlinear and therefore create a large distortion).

FIGS. 4A-4E illustrate simulation results.

Figure 4A:
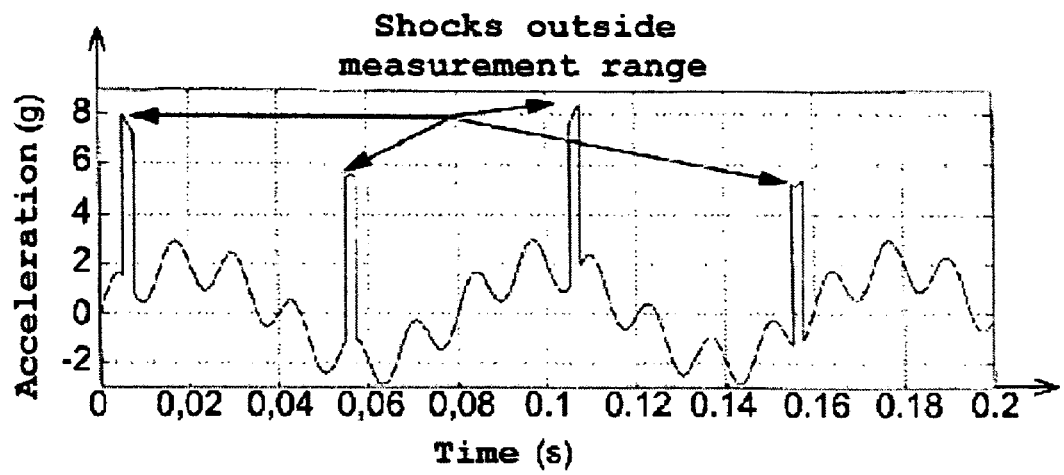
FIGS. 4A-4E show simulation results with a device according to the invention.

FIG. 4A shows the accelerometer input signal (signal to be measured).

It is a sine curve in the figure, for which the amplitude is in the measurement range of the closed loop system.

Shocks outside the measurement range are added to this signal.

Figure 4B:
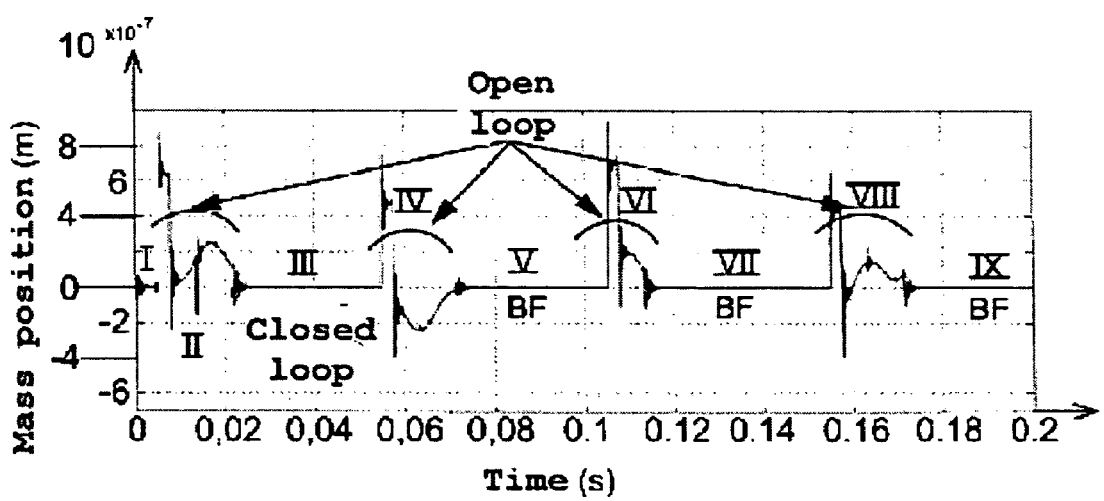
Figure 4C:
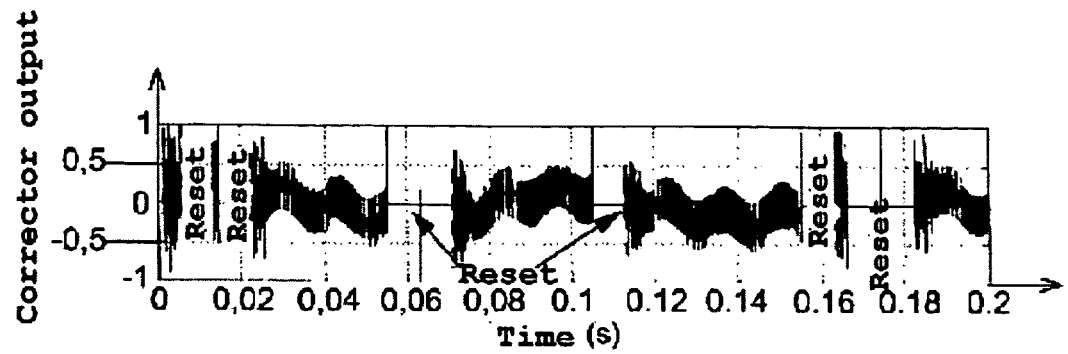

FIG. 4B shows the position of the accelerometer mass, and FIG. 4C shows the output signal from correction means 30.

Figure 4D:
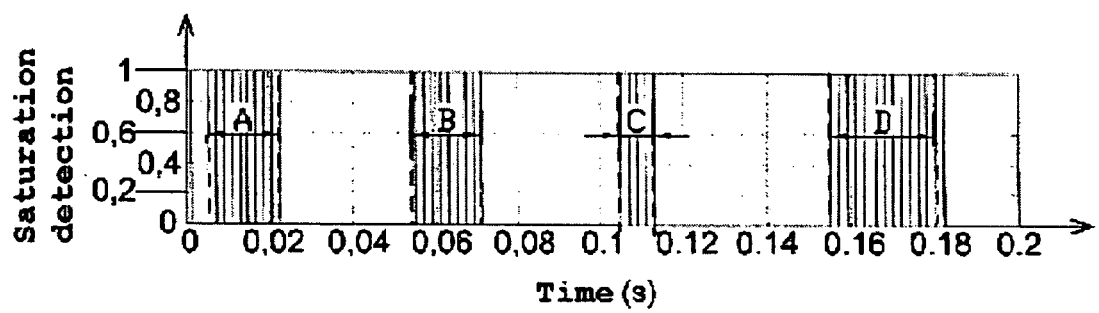

FIG. 4D shows saturation detection areas A,B,C,D.

The system operates very well in closed loop (initial mass movement, valid corrector output, area I in FIG. 4B), until the first shocks.

The closed loop system goes into saturation (see FIG. 4D, zone A) and the mass will touch the accelerometer protection stops (area II in FIG. 4B).

The system detects the saturation and goes into open loop: the mass movement is then no longer controlled and the measurement is degraded but is functional. The system periodically attempts to close the loop as indicated by the RESET areas in FIG. 4C.

The loop closes again (area III in FIG. 4B) and the system returns to its initial state in closed loop.

FIG. 4B identifies other operating areas in open loop (IV, VI, VIII) and in closed loop BF (V, VII, IX).

Figure 4E:
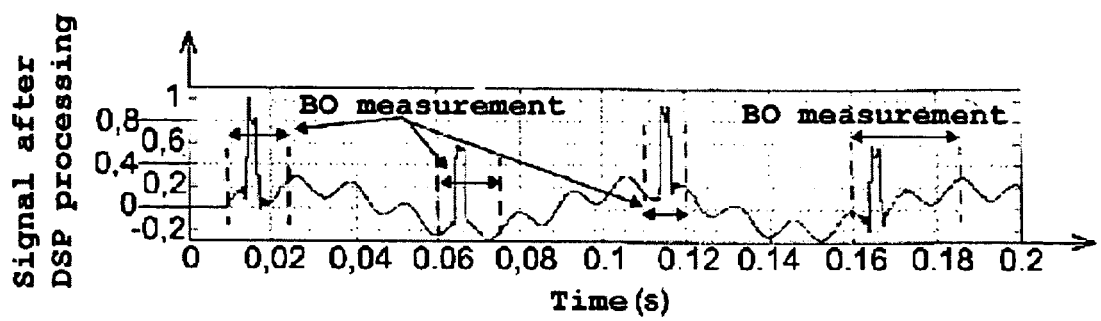

The curve in FIG. 4E shows the decimated and filtered sigma-delta output (digital filters of the sigma-delta coding).

The Figure includes the sine curve largely measured in closed loop, and also peaks outside the range measured in open loop (BO). The end result is that measurement remains functional, even for shocks outside the measurement range.

Therefore the proposed solution provides the performances of closed loop and the robustness of open loop.

The invention claimed is:

1. Accelerometric measurement device with return loop comprising:
   an accelerometer,
   a corrector, to generate a signal for correction of the position of the accelerometer,
   a closed return loop to apply this correction signal to the accelerometer,
   a detector to detect an error in operation of the accelerometer, and means making a first modification to operation of the correction means from its initial state to a modified operating state.

2. Device according to claim 1, the means modifying operation of the corrector are capable of opening the accelerometer return loop.

3. Accelerometric measurement device with return loop comprising:
   an accelerometer,
   a corrector, to generate a signal for correction of the position of the accelerometer,
   a closed return loop to apply this correction signal to the accelerometer,
   a detector to detect an error in operation of the accelerometer, and means making a first modification to operation of the corrector from its initial state to a modified operating state, the means modifying operation of the corrector are capable of modifying one or several operating parameters of the said corrector.

4. Device according to claim 3, the means modifying operation of the corrector are capable of opening the accelerometer return loop.

5. Accelerometric measurement device with return loop comprising:
   an accelerometer,
   a corrector, to generate a signal for correction of the position of the accelerometer,
   a closed return loop to apply this correction signal to the accelerometer,
   a detector to detect an error in operation of the accelerometer, and means making a first modification to operation of the corrector from its initial state to a modified operating state, the accelerometer operation error detector and the means of modifying operation of the corrector being at the output from this corrector.

6. Device according to claim 5, the means modifying operation of the corrector are capable of opening the accelerometer return loop.

7. Device according to claim 5 or 6, the means modifying operation of the corrector are capable of modifying one or several operating parameters of the said corrector.

8. Accelerometric measurement device with return loop comprising:
   an accelerometer,
   a corrector, to generate a signal for correction of the position of the accelerometer,
   a closed return loop to apply this correction signal to the accelerometer,
   a detector to detect an error in operation of the accelerometer, and means making a first modification to operation of the corrector from its initial state to a modified operating state,
   means making a second modification to operation of the corrector from its modified operating state to an initial state.

9. Device according to claim 8, the means making the first modification to operation of the corrector are capable of opening the accelerometer return loop.

10. Device according to claim 9, the means making the first modification to operation of the corrector are capable of modifying one or several operating parameters of the said corrector.

11. Device according to claim 9, the accelerometer operation error detector and the means making the first modification to operation of the corrector being at the output from this corrector.

12. Device according to claim 8, the means making the first modification to operation of the corrector are capable of modifying one or several operating parameters of the said corrector.

13. Device according to claim 12, the accelerometer operation error detector and the means making the first modification to operation of the corrector being at the output from this corrector.

14. Device according to claim 8, the accelerometer operation error detector and the means making the first modification to operation of the corrector being at the output from this corrector.

15. Device according to one of the claims 8 to 13, the second modification to operation of the corrector being made in a single step.

16. Device according to one of the claims 8 to 13, the second modification to operation of the corrector being made in a several steps.

17. Device according to claim 16, the second modification to operation of the corrector being made by modifying the gain of the return loop.

18. Device according to one of the claims 1 to 6 and 8 and 13, the accelerometer operation error detector being used to detect a saturation state of the accelerometer.

19. Device according to claim 8, the second modification to operation of the corrector being made in a single step, and the accelerometer operation error detector being used to detect a saturation state of the accelerometer.

20. Device according to claim 8, the second modification to operation of the corrector being made in a several steps and the accelerometer operation error detector being used to detect a saturation state of the accelerometer.

* * * * *